S. R. BERGMAN.
DYNAMO ELECTRIC MACHINE.
APPLICATION FILED JAN. 16, 1917.
1,334,831.
Patented Mar. 23, 1920.
3 SHEETS—SHEET 1.
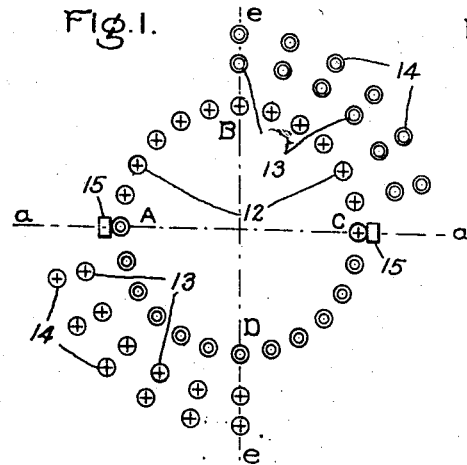
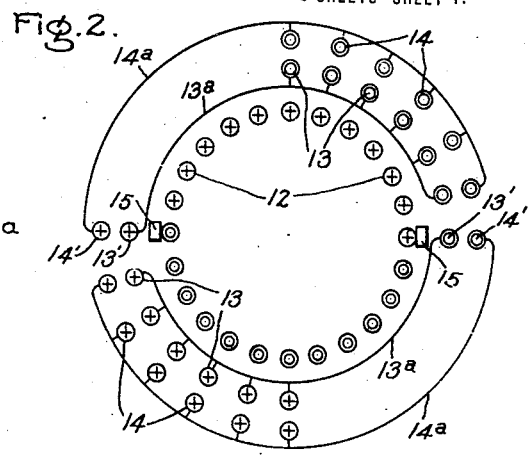
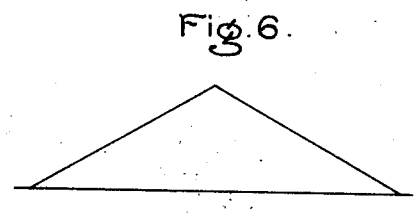
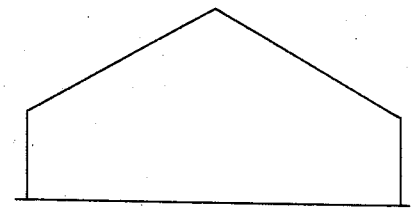
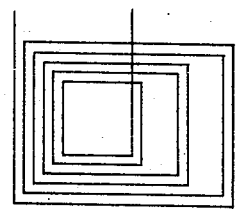
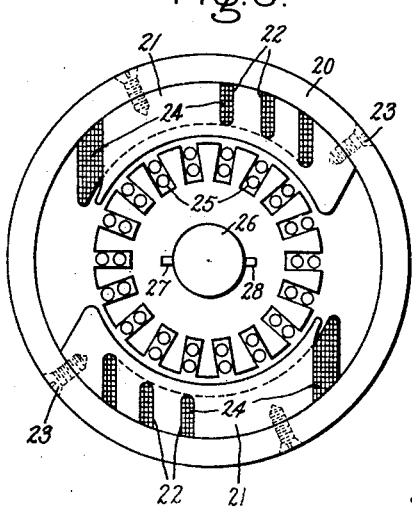
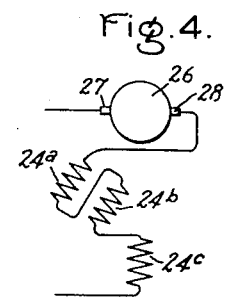
Inventor:
Sven R. Bergman
by Albert E. Davis
His Attorney.

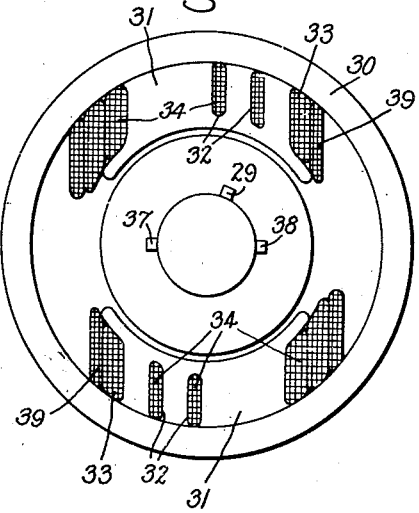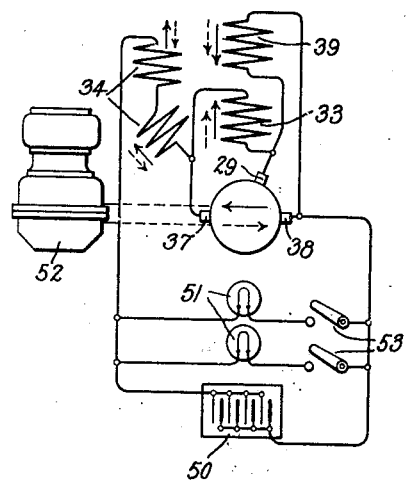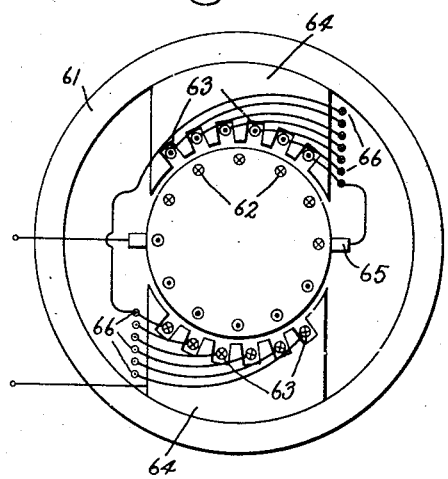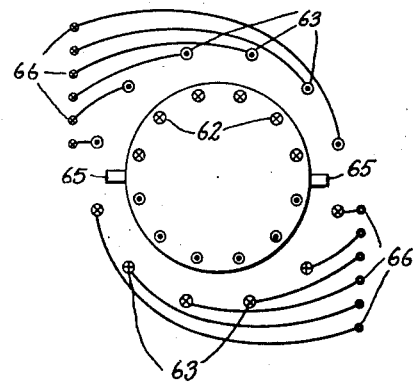

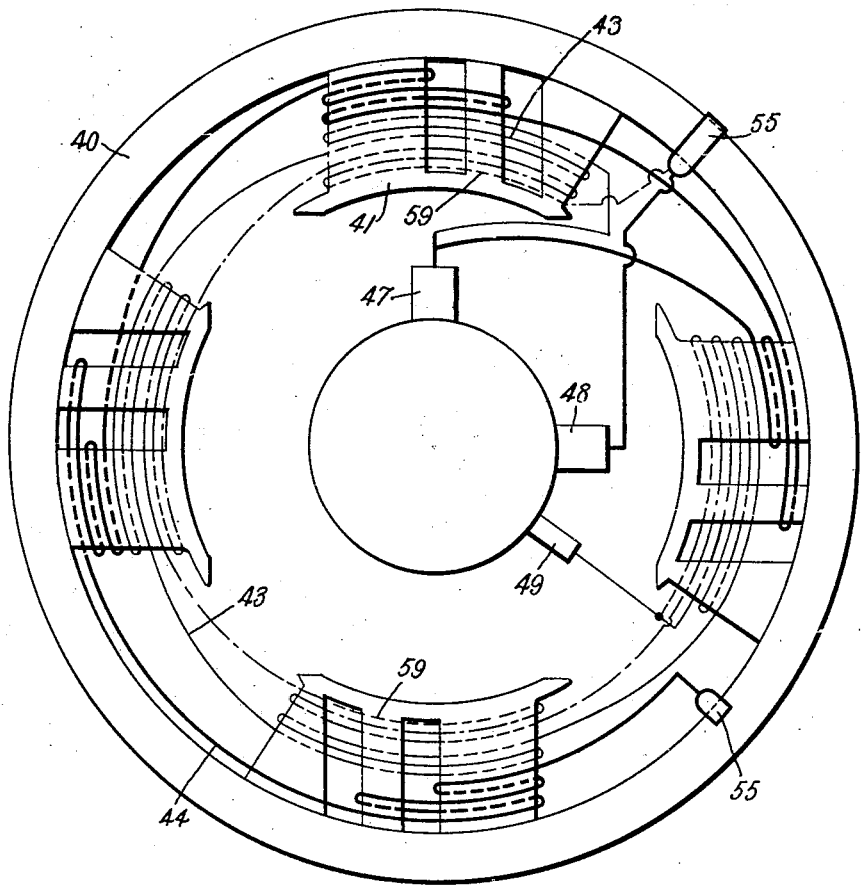

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,334,831.  Specification of Letters Patent.  Patented Mar. 23, 1920.

Application filed January 16, 1917. Serial No. 142,748.

*To all whom it may concern:*

Be it known that I, SVEN R. BERGMAN, a subject of the King of Sweden, residing at Nahant, county of Essex, State of Massachusetts, have invented certain new and useful Improvements in Dynamo-Electric Machines, of which the following is a specification.

My invention relates to dynamo-electric machines, and has for its general object the provision of certain improvements in such machines. The invention more particularly relates to a dynamo-electric machine adapted to be used in combination with an internal combustion engine and a storage battery, where the dynamo-electric machine is used as a motor supplied with electric energy from the battery for starting the engine, and as a generator driven by the engine for charging the battery, and in this connection my invention aims especially to provide an improved dynamo-electric machine adapted for such use in combination with an internal combustion engine and a storage battery. A further object of the invention is to provide a dynamo-electric machine having an improved field winding which operates in part to compensate for the armature reaction and in part to produce an exciting flux. Other objects of the invention will be brought out in the course of the following description.

The novel features which I believe to be patentably characteristic of my invention are definitely indicated in the claims appended hereto. The principle of the invention and its application to and embodiment in dynamo-electric machines will be best understood from the following description taken in connection with the accompanying drawings, in which:

Figures 1 and 2 are explanatory diagrams; Figs. 3, 8 and 12 are diagrammatic views of dynamo-electric machines embodying my invention; Fig. 4 is an explanatory diagram of the electrical connections and magnetic relations of the windings of the machine represented in Fig. 3; Figs. 6 and 7 are diagrams of the flux distribution per pole in the machines represented by the diagrams of Figs. 1 and 2, respectively; Fig. 5 is a diagram of the coils of the field winding of the machine of Fig. 3; Fig. 9 is a diagram of the electrical connections of the machine represented in Fig. 8; and Figs. 10 and 11 are diagrammatic views illustrating a slightly modified form of the invention.

Fig. 1 illustrates diagrammatically a two-pole dynamo-electric machine having a commutated armature winding 12 and a series field winding distributed over one-half of the periphery of the field magnet member. Current distribution in the conductors of these windings is shown by means of the usual convention, in which crosses and circles applied to the conductors indicate, respectively, that the current is flowing away from or toward the observer. The two halves of the conductors of the armature winding between the commutator brushes 15 carry currents flowing in opposite directions, and the armature magnetization is thus along the line $a$—$a$. The series field winding is arranged to produce a magnetization at an angle of approximately 45 electrical degrees to the magnetization produced by the armature winding. The field winding may be considered as consisting of two equal component windings 13 and 14. The field winding 13—14 is connected in series with the armature winding, and is designed so that its magnetizing strength is the same as the magnetizing strength of the armature winding. The magnetomotive force produced by the component winding 13 is therefore equal to the magnetomotive force produced by the component winding 14, and the total magnetomotive force produced by both components of the field winding is equal in magnitude to the magnetomotive force of the armature winding at all loads. The component winding 14 combines with the two quadrants of the armature winding over the arcs A—B and C—D to form a uniformly distributed exciting winding having an axis of magnetization along the line $e$—$e$. That is to say, the winding 14 plus one-half of the armature winding constitutes in effect a distributed exciting winding all around the periphery of the rotor of the machine. The other half of the armature winding over the arcs B—C and D—A is adjacent the component winding 13, and since the radially adjacent conductors of these two windings carry currents flowing in opposite directions, the armature reaction due to this half of the armature winding is neutralized. Thus, one-half of the armature winding combines with one-half of the field winding to produce a series exciting flux, while the other half of the armature winding is magnetically neutralized or compensated by the other half of the field winding, so that the armature reaction is in effect just neutralized at all loads, and the machine has the characteristics of a compensated series machine.

In accordance with my present invention, I provide additional field conductors 13' and 14' which are connected as the return conductors of the distributed conductors of the component field windings 13 and 14, respectively, as diagrammatically represented in Fig. 2. The windings 13—13' and 14—14' may be considered as series field windings in which the conductors of one side of each coil or turn are arranged in distributed slots, while the conductors of the other side of each coil are arranged in a single slot. The current flowing in the concentrated conductors 13' or 14' is the sum of the currents flowing in all of the conductors of the component windings 13 or 14, as the case may be, associated therewith by the end connections 13ª or 14ª. Thus, the magnetizing effect of the current flowing in the concentrated conductors 13' or 14' is equal to the combined magnetizing effect of all of the conductors, per pole, of the component winding 13 or 14, as the case may be. The windings 13—13' and 14—14' are connected in series with the armature winding 12, and the conductors of the component windings 13 and 14 are distributed over that portion of the pole which would otherwise be strengthened by armature reaction and are so proportioned that the combined magnetizing strength of the distributed field conductors is the same as the magnetizing strength of the armature winding at all loads. The component windings 13 and 14 of the machine represented in Fig. 2 are thus proportioned exactly the same as the correspondingly legended windings of the machine of Fig. 1, and as far as these windings are concerned the machines are identical. But the concentrated conductors 13' and 14' of the machine of Fig. 2 constitute in effect the two active sides of a concentrated field coil whose magnetizing axis is substantially along the exciting axis of the machine (e—e of Fig. 1). The concentrated return conductors 13' and 14' of the distributed conductors of the component field windings 13 and 14, respectively, thus combine to form a concentrated exciting winding, so that the machine of Fig. 2 has in effect both a distributed exciting winding, as explained in connection with the machine of Fig. 1, and a concentrated exciting winding, due to the conductor 13'—14'.

The form of the exciting flux resulting from the distributed field winding represented in Fig. 1 of the drawings is shown in the diagram of Fig. 6, while the form of the exciting flux resulting from the combined distributed and concentrated field winding represented in Fig. 2 is shown in the diagram of Fig. 7. It will be observed from the diagrams that the arrangement of Fig. 2 produces more exciting flux than the arrangement of Fig. 1. This will be clearly understood by noting that the distributed conductors of the component windings 13 and 14 produce a magnetization at an angle of 45 electrical degrees to the magnetizing axis of the armature winding, and the effective exciting flux is the same as would be produced by a completely distributed independent exciting winding. The form of such an exciting flux is substantially triangular as represented in Fig. 6. The conductors 13' and 14' constitute in effect a concentrated exciting winding whose magnetization is at an angle of 90 electrical degrees to the axis of magnetization of the armature winding. The concentrated conductors 13' and 14' thus produce a flat-topped flux wave which may be considered as superimposed upon the flux wave of Fig. 6 to produce a resultant flux wave of the form represented in Fig. 7.

It will, of course, be understood that the two component windings 13—13' and 14—14' may and usually will be in practice a single winding. In Fig. 3, I have illustrated a mechanical design of a dynamo-electric machine embodying my invention. The stationary field magnet member of the machine includes a ring 20 of magnetic material, such as iron or steel, to which are secured sector-shaped annular members 21 of laminated magnetic material having distributed or spaced slots 22 extending from the outer periphery nearly to the inner periphery with just enough material left at the inside end of each slot to correspond to the usual magnetic wedge heretofore used in closing such a slot. A field winding 24 is assembled on the annular magnetic members 21, and these members are then secured to the magnetic ring 20 by bolts 23, as clearly described in my co-pending application for Letters Patent of the United States, filed October 18, 1915, Serial No. 56,401.

The field winding 24 carried in the slots between the magnetic members 20 and 21 embodies the principle of my invention illustrated in Fig. 2. The winding may be made up of coils of the form-wound type, and Fig. 5 illustrates, merely by way of example, one way of winding such coils and the connections between the conductors in the distributed groups and the conductors in the single concentrated group. It will be evident that each form-wound coil comprises a plurality of distributed groups of conductors, each conductor of which is connected in series with a conductor in a single group of concentrated conductors. Thus, the field magnet member of the machine has a plurality of distributed slots per pole carrying conductors which are distributed over that portion of the pole which would otherwise be strengthened by armature reaction and which are connected to a plurality of concentrated conductors so that the direction of the current flow in the distributed conductors is opposite to that in the concentrated conductors, and the total magnetizing action of the current in the concentrated conductors is equal to the combined magnetizing action of the current in all of the distributed conductors. The axis of magnetization of the distributed group of conductors is approximately at an angle of 45 electrical degrees to the armature magnetization and the magnetization produced by groups of concentrated conductors is approximately at an angle of 90 electrical degrees to the armature magnetization.

The machine represented in Fig. 3 has an armature of the usual direct current type having a winding 25 connected to the segments of a commutator 26 upon which bear brushes 27 and 28. The diagram of Fig. 4 represents the electrical connections of the armature and field windings of the machine. The resultant magnetization of the field winding may be resolved into three components, as explained in connection with Figs. 1 and 2, and hence the field winding in Fig. 4 is represented as consisting of three component windings $24^a$, $24^b$, and $24^c$. The components $24^a$ and $24^b$ correspond to the distributed groups of conductors 13 and 14 of Figs. 1 and 2. The component windings $24^a$ and $24^b$ produce a magnetization at all loads equal in strength to the armature magnetization and at an angle of 45 electrical degrees thereto. The component winding $24^c$ corresponds to the groups of concentrated conductors 13' and 14' of Fig. 2, and represents that component of the combined field winding 24 whose magnetization is at right angles to the armature magnetization.

In Fig. 8 of the drawings, I have illustrated my present invention embodied in a dynamo-electric machine particularly adapted to be used in combination with an internal combustion engine and a storage battery, where the dynamo-electric machine is used as a motor supplied with electric energy from the battery for starting the engine and as a generator for charging the battery. The field magnet member of this machine consists of two magnetic members 30 and 31 corresponding in construction and function to the members 20 and 21 described in detail in connection with the machine of Fig. 3. The field magnet member has two distributed or spaced slots per pole in which are assembled the distributed groups of conductors of the field winding 34, corresponding in construction and design to the field winding 24 of the machine of Fig. 3. A shunt exciting coil 33 surrounds each of the magnetic members 31, and a bucking coil 39 surrounds each of the shunt coils. An auxiliary brush 29 bears on the commutator and is positioned to be approximately radially beneath the outside slot 32 in one of the magnetic members 31. The winding 34 is connected in series with the armature winding. The shunt coils are connected across the auxiliary brush 29 and the farther main brush 37, while the bucking winding is connected between the auxiliary brush 29 and the nearer main brush 38. It will, of course, be understood that the shunt and bucking windings are so arranged and connected that their magnetizing actions are in opposition. Fig. 9 is a diagram of the electrical connections of the windings of the machine of Fig. 8, while the space positions of the windings indicate the general relations of the magnetizations of these windings. The portion of the winding 34 which is inclined at an angle of 45 degrees to the line of the main brushes 37—38, corresponds to the distributed conductors of this winding, and, as previously explained, this portion of the winding operates to neutralize the armature reaction and to produce a series exciting flux of a substantially triangular wave-form. The other portion of the winding 34 which is inclined at an angle of 90 degrees to the line of the main brushes 37—38 corresponds to the concentrated conductors of this winding, and this portion of the winding produces a supplemental series exciting flux of a substantially rectangular wave-form. The dynamo-electric machine is shown in Fig. 9 as electrically connected to a storage battery 50, and mechanically coupled to an internal combustion engine 52, as in a motor-vehicle starting and lighting outfit. Lamps 51 having circuit-controlling switches 53 are connected across the terminals of the battery 50.

The dynamo-electric machine represented in Figs. 8 and 9 is obviously a compound machine, since it has both series and shunt excitations. As is understood in the art, such a machine when used in an electric starting system for internal combustion engines acts accumulatively as a motor and differentially as a generator. That is to say, the series and shunt excitations act in conjunction when the machine is operating as a motor to start the engine, while the series flux subtracts from or opposes the shunt flux when the machine operates as a generator to charge the battery. In Fig. 9 of the drawings, the relative directions of the magnetizations of the various windings of the dynamo-electric machine are shown by full-line arrows for motoring conditions and by dotted-line arrows for generating and charging conditions. When the dynamo-electric machine of Fig. 9 operates as a motor fed from the storage battery, the exciting turns of the series field winding 34 and the shunt exciting winding 33 will for the most part act magnetically in conjunction. The motoring of the machine will be more particularly mentioned hereinafter. When the machine is operating as a generator, the direction of the magnetomotive force of the series field winding 34 is relatively reversed with respect to its direction when the machine is operating as a motor, while the direction of the magnetomotive forces produced by the shunt and bucking windings remains relatively the same under both conditions of operation of the machine. Considering now the generator action of the machine, the magnetomotive force of the bucking winding is opposite in direction and effect to the magnetomotive force of the shunt winding, and its action magnetically is to subtract therefrom, so that the resultant shunt exciting flux of the machine is determined by the difference in magnetomotive forces of the shunt and bucking windings. The series exciting magnetomotive force of the field winding 34 opposes or bucks the shunt exciting flux between the brushes 37 and 29, but has less effect upon the shunt flux between the brushes 29 and 38. When the machine speeds up, there results a slight increase of current in the armature and series field windings, and accordingly, the resultant exciting flux between the brushes 37 and 29 is slightly decreased, while on the other hand the resultant exciting flux between the brushes 29 and 38 remains substantially unchanged, or at any event its decrease in magnitude is relatively smaller than that of the flux between the brushes 37 and 29. This relation is based on the assumption that the battery voltage, and hence the voltage between the main brushes 37 and 38, remains approximately constant, which relation holds substantially true in practice. Experiments have shown that the voltage between the brushes 29 and 38 varies as a direct function of the speed of the machine. That is to say, the voltage between the brushes 29 and 38 increases as the speed of the machine increases, and, accordingly, the voltage between the brushes 37 and 29 decreases as the speed of the machine increases, assuming the battery voltage to remain substantially constant.

When the machine of Fig. 8 operates as a motor in a system such as represented in Fig. 9, the starting current is approximately twenty-five times the normal current when acting as a generator, and hence the excitation due to the series winding 34 is dominating. As a motor, the machine thus posesses all the advantageous features of a compensated series motor of the type represented in Figs. 2 and 3 of the drawings, and, accordingly, has excellent starting torque. When operating as a generator, the bucking winding serves to decrease the exciting flux as the speed of the machine increases, as explained in the preceding paragraph, and the voltage at the terminals of the machine therefore remains practically constant. The machine can thus operate as a compensated series motor with high starting torque or as a generator of practically constant voltage over a considerable range of speeds when used in combination with a variable speed internal combustion engine and a storage battery.

The dynamo-electric machine of my present invention is particularly adapted for use on motor vehicles, and, merely by way of example, I will refer to a machine particularly designed for starting the variable speed engine of such a vehicle, where 250 amperes are taken at starting from a 12-volt storage battery for cranking or starting the engine. A tremendous armature reaction obviously results, but this is substantially neutralized by my improved type of series field winding. The charging current has a maximum value of about ten amperes for any practical speed of the engine.

In Fig. 12, I have illustrated a four-pole machine embodying my invention. It will be observed that the back-slotted magnetic pole members 41 are secured to the magnetic stator frame 40. The machine of Fig. 12 has a series field winding 44 connected in series with the armature winding, a shunt winding 43 connected between the brushes 47 and 49 and a bucking winding 59 connected between the brushes 49 and 48. The terminals of the machine are shown at 55. This figure illustrates clearly the manner of winding the coils of the different windings in a machine embodying my invention and the electrical connections of these coils and windings. It will be understood that the series field winding 44 embodies the principles of the winding 24 of Fig. 3. The brush 49 corresponds in position and function to the brush 29 of the machine represented in Fig. 8. The machine of Fig. 12, is, indeed, of the same type as represented in Fig. 8, and is particularly adapted to be used in combination with a variable speed internal combustion engine of the automobile type and a storage battery.

In Fig. 10 I have illustrated my present invention embodied in a slightly different type of machine. The machine diagrammatically represented by this figure has a commutated armature winding 62 and coöperating commutator brushes 65. A completely distributed compensating winding 63 is carried in distributed slots in the stationary field magnet. The conductors of the distributed field winding 63 form one side of a plurality of coils of which the conductors of the other side 66 thereof are concentrated. In other words, the concentrated conductors 66 are the return conductors of the distributed conductors of the compensating winding 63. The field winding 63—66 is designed to be connected in series with the armature winding 62, and the distributed conductors of the compensating component 63 thereof are proportioned to just neutralize the armature magnetization. The two groups of concentrated conductors 66 form in effect the two sides of a concentrated exciting coil whose magnetizing axis is electrically in quadrature with the magnetizing axis of the armature winding. The concentrated conductors 66 thus constitute the exciting winding of the machine, and, consequently, produce a series exciting flux. In Fig. 11, I have shown a practical arrangement of this form of the invention. Magnetic poles 64 are secured in any suitable manner to a magnetic stator frame 61. The inner periphery of each pole 64 is slotted, and in these slots are carried the distributed conductors 63, while the return conductors 66 therefor are wound around one end of the pole. In practice, the distributed conductors 63 need not be uniformly distributed over the entire 180 electrical degrees of the armature winding whose reaction is to be compensated thereby. The distribution of the conductors 63 which is represented in Fig. 11 gives a close enough approximation of complete neutralization of the armature reaction for all practical purposes. Indeed, for most practical purposes, the ratio of the distributed compensating conductors 63 to the corresponding armature conductors 62 and the electrical arc spanned by the distributed conductors 63 is relatively unimportant. The essential feature being that the distributed conductors 63 substantially neutralize the armature reaction at all loads.

The machine of Figs. 10 and 11 differs practically from the machine of Figs. 2 and 3 in that in the former all of the armature magnetization is neutralized by the distributed field winding 63, while in the latter half of the armature magnetization combines with one-half of the magnetization of the distributed field winding to produce an exciting flux of the form produced by a distributed exciting winding. In both machines, however, the complete field winding is composed of coils of which the conductors of half of each turn act magnetically to neutralize, in whole or in part, the armature reaction, while the conductors of the other half of each turn act to produce an exciting flux. In other words, the conductors of half of each coil of this complete field winding are distributed and act, in whole or in part, as a compensating winding, while the return conductors for such distributed conductors, that is the conductors of the other half of each coil of the winding, are concentrated and act to produce an exciting flux for the machine. Both machines are compensated series machines, but it will be evident that the machine of Figs. 2 and 3 has the stronger exciting flux. Due to its peculiar distribution, the improved field winding of my present invention in either of the forms herein particularly described, has a relatively small mean-length-of-turn, even smaller than in an ordinary field coil spanning the whole pole.

The particular form of the invention disclosed in Figs. 10 and 11 form the subject-matter of my application, Serial No. 332,672, filed Oct. 23, 1919.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A dynamo-electric machine comprising an armature winding, a field winding having a plurality of spaced conductors per pole distributed over that portion of the pole which would otherwise be strengthened by armature reaction, and a single group of concentrated conductors per pole electrically connected to said spaced conductors and arranged to produce a magnetization at an angle to the axis of magnetization of said armature winding and at an angle to the magnetization produced by said spaced conductors.

2. A dynamo-electric machine comprising an armature winding, a field winding having a plurality of spaced conductors per pole distributed over that portion of the pole which would otherwise be strengthened by armature reaction and arranged to produce a magnetization at an angle of approximately 45 electrical degrees to the magnetization produced by said armature winding, and a single group of concentrated conductors per pole arranged as the return conductors for said spaced conductors.

3. A dynamo-electric machine comprising an armature winding, and a field winding having a plurality of spaced conductors per pole, distributed over that portion of the pole which would otherwise be strengthened by armature reaction, each conductor being connected in series with a conductor in a single group of concentrated conductors per pole, the axis of magnetization of the spaced conductors being approximately at an angle of 45 electrical degrees to the axis of magnetization of the armature winding, and the magnetization resulting from said concentrated conductors being at such an angle to the armature magnetization as to produce an exciting flux.

4. A dynamo-electric machine comprising an armature winding, a field magnet member having a pole piece with a plurality of distributed slots therein, a series field winding having a plurality of spaced conductors positioned in said slots distributed over that portion of the pole which would otherwise be strengthened by armature reaction and a single group of concentrated return conductors adjacent one end of said pole piece, and a shunt exciting winding and a bucking winding surrounding said pole piece.

5. A dynamo-electric machine having an armature winding provided with a commutator and main brushes, a field magnet member having a pole piece with a plurality of distributed slots therein, an auxiliary brush bearing on said commutator and positioned substantially beneath the outside slot of said distributed slots, a series field winding having a plurality of spaced conductors positioned in said slots and a single group of concentrated return conductors adjacent one end of said pole piece, a shunt exciting winding surrounding said pole piece and connected between said auxiliary brush and the farther of said main brushes, and a bucking winding surrounding said pole piece and connected between said auxiliary brush and the nearer of said main brushes.

6. A dynamo-electric machine comprising an armature winding, a field magnet member having pole pieces with completely inclosed spaced slots and a continuous inner periphery, and conductors carried in the spaced slots of each pole piece distributed over that portion of the pole which would otherwise be strengthened by armature reaction and connected in series with concentrated conductors adjacent the other end of the pole piece, the magnetization produced by the conductors in said spaced slots being at an angle of approximately 45 electrical degrees to the magnetization produced by said armature winding, and the magnetization produced by said concentrated conductors being at such an angle to the magnetization produced by said armature winding as to produce an exciting flux.

7. A dynamo-electric machine comprising an armature winding, a field magnet member having pole pieces with completely inclosed spaced slots and a continuous inner periphery, a series field winding consisting of conductors carried in the spaced slots of each pole piece and connected in series with concentrated conductors adjacent one end of the pole piece, said conductors in said spaced slots being distributed over that portion of the pole which would otherwise be strengthened by armature reaction, the magnetization produced by the conductors in said spaced slots being at an angle of approximately 45 electrical degrees to the magnetization produced by said armature winding, and the magnetization produced by said concentrated conductors being at such an angle to the magnetization produced by said armature winding as to produce an exciting flux, and a shunt exciting winding surrounding each pole piece.

8. A dynamo-electric machine comprising an armature winding provided with a commutator and two main brushes, a field magnet member having pole pieces with completely inclosed spaced slots and a continuous inner periphery, a series field winding consisting of conductors carried in the spaced slots of each pole piece and connected in series with concentrated conductors adjacent one end of the pole piece, the magnetization produced by the conductors in said spaced slots being at an angle of approximately 45 electrical degrees to the magnetization produced by said armature winding, and the magnetization produced by said concentrated conductors being at such an angle to the magnetization produced by said armature winding as to produce an exciting flux, an auxiliary brush bearing on said commutator and positioned so that the armature conductors between this brush and the nearer main brush are positioned in a substantially uniform magnetic field, a shunt exciting winding surrounding each pole piece and energized by an electro-motive force derived from said auxiliary brush and the farther of said main brushes, and a bucking winding surrounding each pole piece and energized by an electromotive force derived from said auxiliary brush and the nearer of said main brushes.

9. A dynamo-electric machine comprising an armature winding, and a series field winding arranged so that one-half of each turn produces a magnetomotive force for neutralizing the armature reaction while the other half of each turn produces a series exciting flux substantially in quadrature with the armature magnetization.

10. A dynamo-electric machine comprising an armature winding, a field magnet member having a pole piece with a plurality of distribution slots therein, and a series field winding having the conductors of one-half of each turn thereof distributed in said slots in that portion of the pole which would otherwise be strengthened by armature reaction and arranged to produce a magnetomotive force for neutralizing the armature reaction while the conductors of the other half of each turn are concentrated adjacent to the other end of said pole piece and arranged to produce a series exciting flux substantially in quadrature with the armature magnetization.

In witness whereof, I have hereunto set my hand this thirteenth day of January, 1917.

SVEN R. BERGMAN.